3,396,440
CLAMPING BAND FOR HOSES
Johannes C. P. van Schendelen, Jac. Perklaan 7,
Heemstede, Netherlands
Filed Feb. 6, 1967, Ser. No. 614,164
Claims priority, application Netherlands, Feb. 11, 1966,
6601797
6 Claims. (Cl. 24—279)

ABSTRACT OF THE DISCLOSURE

A clamping device e.g. for clamping for hoses comprising a band, one end thereof being pivotably connected with a pin of a housing, the other end thereof being pivotally connected with a guide member which is movable in or on a guide path by means of a screw and a resistance plate; and said housing being provided with a bridge part, in order to obtain a uniform clamping round about of clamping band and bridge part.

---

Figure 1:
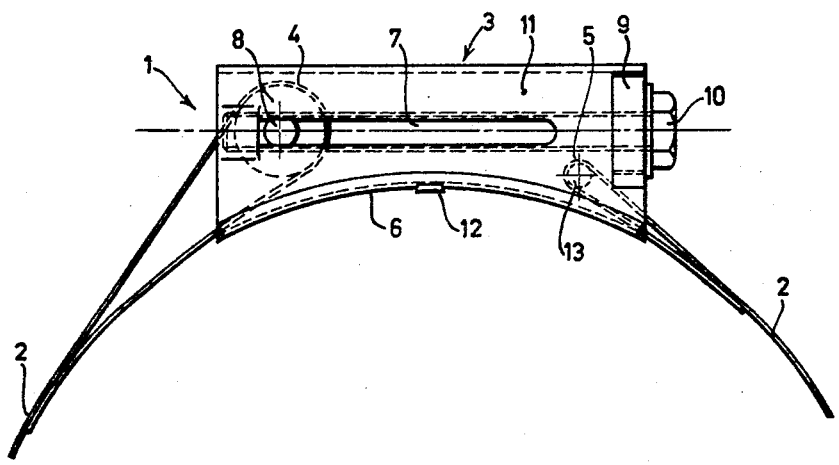

My invention relates to a clamping device, e.g. for clamping hoses and the like.

Many types of clamping devices are already known which can be used as hose clamps, locking rings or clamping bands. These types can be divided into three classes to wit:

(a) Those with which clamping is effected by means of a worm screw;

(b) Those with which clamping is effected by compressing or drawing closer the ends of the clamping band;

(c) Those with which clamping is effected by means of a screw or bolt protruding through the ends of the band.

These types have all one or more disadvantages. So for instance in the type a the clamping is almost round about, while an ample dimensional range is available, but both are limited owing to the fixed radius and the fixed long screw holder. A very important disadvantage is furthermore in that the worm cooperates only for a small part of its circumference with the clamping band, mostly only for some teeth, so that the clamping is limited. Moreover the clamping band can only be tensioned whilst applying a screw driver which implies all kind of trouble. In the event of very great tensions a worm with e.g. a hexagonal head could be used, but in this case it inevitably occurs that the worm is overturned, so that the clamping effect is limited.

The type under b has also various disadvantages of which the most important ones are a very small dimensional range, a very limited clamping effect and the fact that clamping is not effected round about. Owing thereto this type is only suitable for clamping in the event of smaller hose diameters.

The type mentioned under c is disadvantageous in that owing to the required auxiliary piece with a fixed point on one side, this auxiliary piece being also called a lip, the clamping round about is not equal. A further disadvantage of this type is in that with minor tensions the screw or bolt becomes distorted and the nut is overturned on account of radial tensile stress. Attempts have been made to obviate these disadvantages in the way that both in small and large sizes the dimensional range, that is to say the distance between the ends of the clamping band, is kept as small as possible by applying a relative short and thick screw and by reinforcing the ends of the clamping band by pieces with an L section, folding nuts and the like. These suggestions meet, however, with no success, while moreover the dimensional range of this clamping device and the clamping effect thereof are limited.

It is now an object of the invention to provide a clamping device which on the one hand has an ample dimensional range and on the other hand grips round about with an equal radius in such manner that the desired clamping becomes possible at any rate, while there is no risk that the tension is eased.

According to the invention a clamping device, e.g. for clamping hoses comprises a clamping band which at its two end portions cooperates with tightening means, said tightening means exerting a linear tensile force on at least one of the end portions of the clamping band, the end portions being preferably capable of cooperating pivotally with the tightening means.

A bridge part is provided between the two end portions of the band which can cooperate in such a way with the clamping band that substantially a uniform clamping round about of clamping band and bridge part is obtained.

The construction suggested according to the invention exhibits the advantage that the tension, produced when the clamping band is clamping, is converted into a combination of a linear tension and a radial tension, whereby the aforementioned ideal clamping effect is obtained.

According to a preference embodiment the tightening means for exerting a linear tensile force consists of a guide member pivoted to the clamping band and a guide member which is movable in or on a guide path. The guide member can cooperate with a tightening screw, retained by a resistance plate, and be moved thereby.

When a steel tightening screw, mounted in a screw holder, is applied it becomes possible on tightening the tightening screw to exert a linear tensile force and to overcome thereby linearly the linear and radial tension without giving rise to distortion of the tightening screw or overturning of nuts and the like.

So in the construction according to the invention the end portions of the clamping band are not directly connected with the ends of the tightening screw, but they have a fixed point in the screw holder in the shape of a housing which on its lower end is closed by the bridge part.

Due to the application of indirect clamping it becomes possible to employ a long tightening screw which allows for an ample dimensional range. This can, if desired, be enlarged by incorporating two or more screw holders.

Tensioning of the clamping device is effected by means of a hollow head screw wrench, a socket wrench, or a socket spanner whereby in dependence on the strength of the material the clamping tension can almost unlimitedly be increased.

The invention will now be clarified with reference to the drawing in which an embodiment of a clamping band of the invention is represented.

Figure 2:
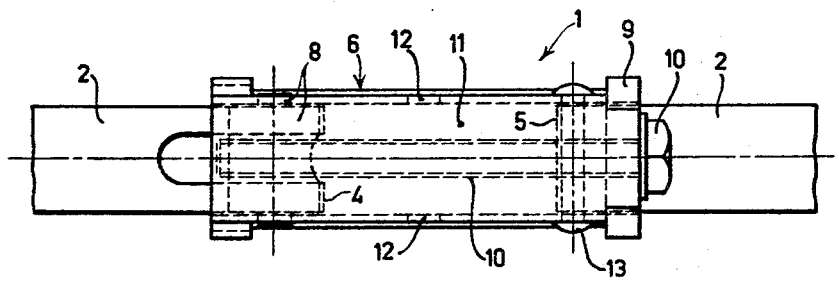

In the drawing:

FIGURE 1 is a side elevation of the clamping device according to the invention, and FIGURE 2 is a plan view of a device according to FIGURE 1.

Represented in the figure is a clamping device 1 in the shape of a hose clamp for clamping a hose on a tube stub consisting of an open clamping band 2. This open clamping band 2 has two end portions 4 and 5 which are formed by a bent part of the band which by spot welding are connected with the clamping band. These two end portions 4 and 5 can cooperate with the tightening means 3 (being placed in the tangent of the clamping circle), the latter being capable of exerting a linear pull on at least one of the end portions 4 of the clamping band. The removable end portion 4 and the end portion 5 are pivoted to the tightening means by means of a guide member 8 to be clarified hereinafter and a pin 13. Provided between the end parts 4 and 5 is a bridge part 6 in the shape of a bent thin metal plate which in general has the same width as the clamping band 2.

The tightening means for exerting a linear tensile force on the end part 4 of the clamping band 2 consists of a guide member 8 pivoted to the clamping band and movable in or on a guide path 7. Provided in this guide 8 is a threaded bore in which can screw a tightening screw 10. This screw 10 is retained by a resistance plate 9.

The aforementioned guide path 7 consists of a straight recess provided in a housing 11, which at its lower end is closed by the bridge part 6. The bridge part 6 is preferably riveted in the middle to the housing 11.

In use of the aforementioned clamping device and after its placement at the desired location the tightening screw is screwed through the bore of the guide member 8. On screwing on the screw 10 the guide member 8 is displaced through the guide path 7, the end part 4 of the clamping band 2 being taken along. Under the influence of this movement the clamping band 2 presses on the bridge part 6 and bends same the same effect being produced due to the pivotal connection of the other end part 5 of the clamping band by means of the pin 13, so that the bridge part 6 fits precisely to the radius of the clamping band 2 and consequently a clamping round about is achieved.

In the device according to the invention the house 11 is furthermore pressed on the bridge part 6 in the process of clamping, whereby a full locking is ensured at the location whereat no band is available. Due to the rectilinear displacement of the guide member 8 in the slot 7, the sides of the former being capable of bearing against the edges of the guide path, the tightening screw cannot be distorted and no more can the screw thread in the guide member 8 be overturned. Since the screw holder is recessed, whereby the clamping device can be easily mounted and dismounted, many requirements of the practice are met. The risk is excluded that the clamping device according to the invention is released owing to external influences like the weather conditions, vibration, shocks and the like.

An optimum cooperation between the tightening screw and the guide member is ensured due to the cylindrical shape of the latter so that easing owing to external influences is impossible.

Having thus described the invention and manner of its operation, what I claim as my invention is:

1. A clamping device adapted for use as a hose clamp, comprising a clamp band adapted to engage a hose and having the free ends thereof bent back upon themselves to form bight portions adapted to engage portions of a clamping means which are so arranged and associated with suitable means for drawing the ends of the clamp band together upon application of a linear tensile force thereon, said clamping means comprising a housing having a generally arcuately curved portion adapted to extend underneath the said band free ends to form a continuation of the band so as to completely encircle an associated hose, means on said housing for defining a rectilinear guide path, said clamping means further comprising a member received within the bight of one of the free ends and adapted to slide along said guide path, the other free end of the band being pivotally secured by suitable means to an end portion of the housing, said housing being provided with means for bearing against and supporting a tightening screw which is provided with means for engaging a suitably formed portion of said slidable member so as to tighten the clamp upon rotation thereof.

2. A clamping device according to claim 1, wherein said tightening means for exerting a linear tensile force comprises a guide member pivoted to the clamping band, said guide member being moved in or on a straight guide path.

3. A clamping device according to claim 1, wherein said guide member cooperates with a tightening screw, retained by a resistance plate, and be moved thereby.

4. A clamping device according to claim 1, wherein the guide path consists of a straight recess provided in a housing, the edges of the recess being capable of cooperation with the sides of the guide member.

5. A clamping device according to claim 1, wherein a bridge part is provided between the two pivotally connected end portions which cooperates with the clamping band in such a way that substantially a uniform clamping effect round about of clamping band together with the bridge part is obtained.

6. A clamping device according to claim 5, wherein said bridge part closes said housing at its lower part.

References Cited

UNITED STATES PATENTS

| 2,341,828 | 2/1944 | Tetzlaff | 24—279 |
| 2,677,866 | 5/1954 | Tetzlaff | 24—279 |
| 2,688,170 | 9/1954 | Balzer. | |

FOREIGN PATENTS

| 47,068 | 9/1936 | France. |

(First addition to 793074)

DONALD A. GRIFFIN, *Primary Examiner.*